United States Patent [19]

Carnewal et al.

[11] 4,099,942

[45] Jul. 11, 1978

[54] ROTARY AIR FILTER

[75] Inventors: José A. C. L. Carnewal, Eeklo; Etienne R. O. C. Hommez, Oostende, both of Belgium

[73] Assignee: Sperry Rand Corporation, New Holland, Pa.

[21] Appl. No.: 789,174

[22] Filed: Apr. 20, 1977

[30] Foreign Application Priority Data

Apr. 27, 1976 [GB] United Kingdom ............... 16973/76

[51] Int. Cl.² ............................................ B01D 46/26
[52] U.S. Cl. ...................................... 55/396; 55/466
[58] Field of Search ............ 55/267, 290, 351, 385 B, 55/400, 406, 408, 409, 396, 397, 466, 467, 407, 317, 337, 401

[56] References Cited

U.S. PATENT DOCUMENTS

| 2,616,519 | 11/1952 | Crankshaw et al. | 55/396 |
| 2,648,396 | 8/1953 | Kirby | 55/400 |
| 2,688,378 | 9/1954 | Perrin | 55/396 |
| 3,406,504 | 10/1968 | Sylvan | 55/408 |
| 3,816,981 | 6/1974 | Carewal et al. | 55/267 |

FOREIGN PATENT DOCUMENTS

| 130,295 | 12/1950 | Sweden | 55/408 |
| 1,433,596 | 4/1976 | United Kingdom | 55/385 B |

Primary Examiner—Frank W. Lutter
Assistant Examiner—David L. Lacey
Attorney, Agent, or Firm—Frank A. Seemar; John B. Mitchell; Joseph A. Brown

[57] ABSTRACT

The invention relates to a rotary air filter for use in combination with a cooling radiator or another cooling device and which has to operate in a dusty atmosphere. The rotary air filter comprises a hollow rotary structure having a perforated rotary filter element mounted on the intake side of a fan operable to draw air through the filter element, the rotary structure having a generally unobstructed inner surface lengthwise thereof, and a discharge opening being provided adjacent the fan and generally in line with said unobstructed inner surface for enabling the discharge therethrough of foreign material entering through the perforations in the rotary filter element.

4 Claims, 4 Drawing Figures

ROTARY AIR FILTER

BACKGROUND OF THE INVENTION

1. Field of the Invention

This invention relates to rotary air filters which can be applied to all types of devices which have to operate in a dusty atmosphere.

For example, such devices may be cooling systems for internal combustion engines or cooling systems for the working fluid of hydraulic equipment. One particularly useful application of the present invention is to the cooling system of the internal combustion engine of a combine harvester because such machines often work in a very dusty atmosphere. Indeed, these machines can only harvest when the crop is ripe and dry which means that during the harvesting operation a considerable amount of dust, chaff and short straw particles are displaced in the vicinity of the machine.

2. Description of the Prior Art

One of the problems with rotary air filters is that either the filter element tends to become blocked relatively quickly when operating in a dusty atmosphere or foreign matter passes through the filter element and tends to block the radiator in the case of a cooling system for an internal combustion engine. In order to meet this problem, rotary air filters have been provided with stationary shields which cover portions of the filter elements as they move relative thereto and thereby interrupt the flow of air through the filter elements, whereby any foreign matter adhering to the elements under suction tends to fall therefrom. An air filter of this type is disclosed in U.S. Pat. No. 3,816,981. More specifically such a filter comprises a perforated rotatable filter element and a fan operable to draw air through the filter element except for that portion covered by the stationary shield at a given instant. A certain proportion of foreign matter drawn against the exterior surface of the filter element is immediately discharged therefrom under centrifugal force which is advantageous. Any foreign matter not removed under centrifugal force will tend to be removed by the action of the stationary shield as already described. Also, because the air filter rotates, there is less chance of foreign matter passing through the perforations in the filter element than would be the case if the filter element were stationary.

Experience with these rotary filters has shown that irrespective of all precautions taken, foreign matter still enters the filter element and in the context of combine harvesters, the most problematical foreign matter is that of barley beards or awns which have an elongated shape. The lengthwise dimensions of the beards or awns exceed the diameter of the perforations in the filter element but the diameters thereof are smaller than the diameter of the perforations. It is assumed that the air turbulences adjacent the outer surface of the filter element are responsible to a great extent for the fact that foreign matter still enters the filter. Experience has also shown that, when the circumferential speed of the rotary filter element exceeds a certain threshold, any foreign matter which enters the element no longer moves further in the direction of the air stream but instead, remains on the inner side of the element, while centrifugal forces obviously have an influence on this phenomenon, an exact and complete explanation cannot be offered.

Furthermore, measurements have indicated that the suction force on the intake side of the fan increases as the distance from the fan decreases, whereby there is a tendency for foreign matter entering the filter element to be drawn towards the fan. If there is any obstruction on the interior surface of the filter element against which foreign matter can build up, the likelihood is that this will result in foreign matter entering the airstream and being taken to the item being cooled, such as a radiator.

The main object of the present invention is to avoid or to attenuate the aforementioned disadvantages of known rotary air filters.

SUMMARY OF THE INVENTION

According to the present invention a rotary air filter comprises a hollow rotary assembly having a perforated rotary filter element mounted on the intake side of a fan operable to draw air through the filter element, the rotary assembly having a generally unobstructed inner surface lengthwise thereof and a discharge opening being provided adjacent the fan and generally in line with said unobstructed inner surface.

Thus any foreign matter which, irrespective of all precautions taken, suceeds in penetrating the air filter is to a great extent discharged from the discharge opening before it can be passed to other associated equipment.

Preferably the filter element is generally cylindrical with a substantially closed end remote from the fan but a conical or frusto-conical shape with the base of the cone positioned adjacent the fan also could be employed. In any event, no inwardly-projecting edges or the like should obstruct movement of foreign matter along the inner side of the rotary assembly towards the fan. Preferably the discharge opening is formed by an annular clearance between the rotary assembly and a stationary member. This annular clearance may be positioned either in the same plane of the fan or preferably at a small distance from the fan on the pressure side thereof.

The discharge opening replaces the previously commonly employed sealing means between the rotary filter assembly and the adjacent stationary structure and in use prevents the ingress of foreign matter therethrough. The annular discharge opening may be tapered when seen in section, with a relatively wide entrance ensuring that all foreign matter can enter it and a relatively narrow exit so as to reduce pressure losses.

BRIEF DESCRIPTION OF THE DRAWINGS

A rotary air filter in accordance with the invention will now be described in greater detail, by way of example, with reference to the accompanying drawings in which.

DETAILED DESCRIPTION OF THE INVENTION

In General

Figure 1:
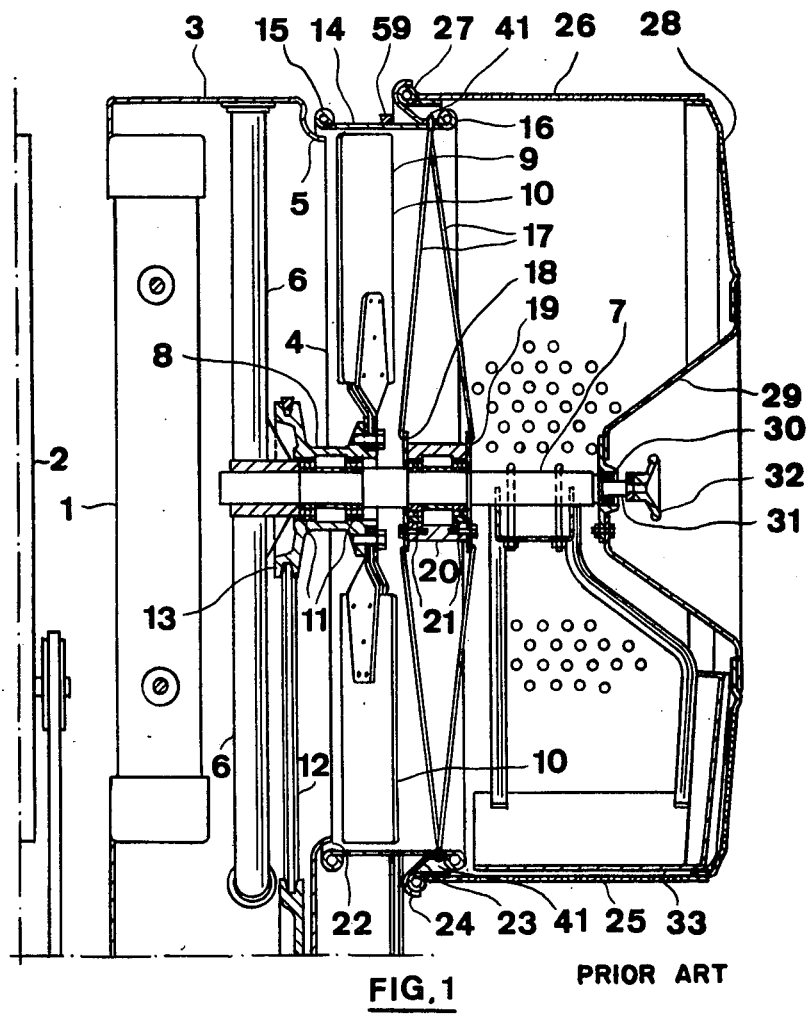
FIG. 1 is an axial section of a known rotary air filter as applied to a cooling device for an internal combustion engine.

Referring to FIG. 1, there is shown a cooling device 1 (such as a radiator) through which flows cooling fluid for an internal combustion engine 2. The cooling device 1 is mounted in a casing 3 which in turn is mounted on a frame (not shown) and has a front circular opening 4 defined at the outer edge by a collar 5. In the casing 3, supports 6 are provided as a mounting for one end of the fixed shaft 7 located perpendicularly to, and in front of, the cooling device 1. A hub 8 of a fan 9 having fan blades 10 is rotatably mounted on the shaft 7 by means of bearing 11. The fan 9 is installed in front of the opening 4 and has a pitch diameter which slightly exceeds the diameter of the opening 4. The fan 9 is driven by a V-belt 12 via a sheave 13.

A ring 14 with turned edges 15, 16 is supported by spokes 17 on the flanges 18 and 19 of the hub 20, which itself is rotatably mounted by bearings 21 on the stationary shaft 7. The diameter of the ring 14 slightly exceeds the diameter of the fan 9 so that the ring 14 can be mounted around this fan 9 with the turned edge 15 defining, in conjunction with the collar 5, a relatively narrow slot 22. A frustoconical ring 23 is welded or otherwise attached to the ring 14 and its free edge 24 is shaped to provide a centering lip for a perforated filter element 25. The centering lip 24 and the filter element 25 have a diameter which slightly exceeds the diameter of the ring 14. The filter element 25 is formed mainly by a perforated cylindrical body 26 with a turned edge 27 at one end which is cooperable with the centering lip 24 of the ring 23, and a front wall member 28 at the other end. The front wall member 28 has an outer perforated section and a central, frustoconical non-perforated section 29 and is rotatably mounted via bearing means 30 on a shaft 31. The shaft 31 has a threaded end (not shown) for cooperation with a tapped hole (not shown) in the stationary shaft 7 and supports at its other end a handwheel 32 for facilitating the mounting of the perforated filter element 25 on the shaft 7. Thus the filter element 25 can readily be assembled and removed by the detachable connection provided by the shaft 31. A shield 33 is mounted inside and closely adjacent the lower portion of the cylindrical body 26 as well as adjacent a lower portion of the front wall member 28. The arrangement described above is that disclosed in U.S. Pat. No. 3,816,981.

In operation, the fan 9 is driven by the belt 12 and sucks cooling air through the filter element 25 and then blows it through the cooling device 1. The filter element 25 is driven by a belt 59 engaging the ring 14. In this way, larger particles of foreign matter, such as chaff and straw in the case of a combine harvester application, are drawn onto the element 25 but as the latter rotates, this foreign matter is carried over the region of the shield 33, where suction of air through the element is interrupted, whereby the foreign matter tends to fall from the element. As in all rotary filters, small dust particles or the like are generally kept from the element 25 by the rotary movement thereof, because the dust has less chance to get through the perforations and also, dust particles and the like that land on the element are submitted to a centrifugal force which tends to throw the particles off the element. Also, since the annular opening 22 is positioned at the pressure side of the fan 9, a continuous air stream is directed from the inner side to the outer side therethrough and dust or the like is positively prevented from entering the filter at this location, even though there is no mechanical sealing contact between the rotary filter assembly and the stationary element 3.

Figure 3:
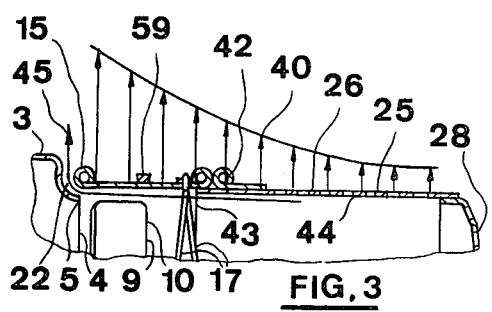
FIG. 3 is a partial sectional view of the portion indicated at III in FIG. 2 combined with a pressure diagram.

Experience with this type of air filter has shown that some foreign matter such as barley awns or barley beards, for example, still enter the filter element 25 through the perforations thereof. This foreign matter tends to settle on the inner surface of the cylindrical body 26 when the circumferential speed of the rotary element 25 exceeds a certain threshold. Measurements have indicated that, as shown in FIGS. 3 at 40, the suction force is greater at the portion of the cylindrical body 26 closely adjacent the section fan 9, than at the portion of the body 26 adjacent the front wall 28. As a result, foreign matter which manages to enter the filter element 25 tends to move along the inner surface of the body 26 towards the suction fan 9. The annular pocket 41 of the known structure of FIG. 1 interrupts this axial movement and hence foreign matter is accumulated therein. This automatically results in foreign matter being deflected into the air stream towards the cooling device 1 when the pocket has filled up.

PREFERRED EMBODIMENT

Figure 2:
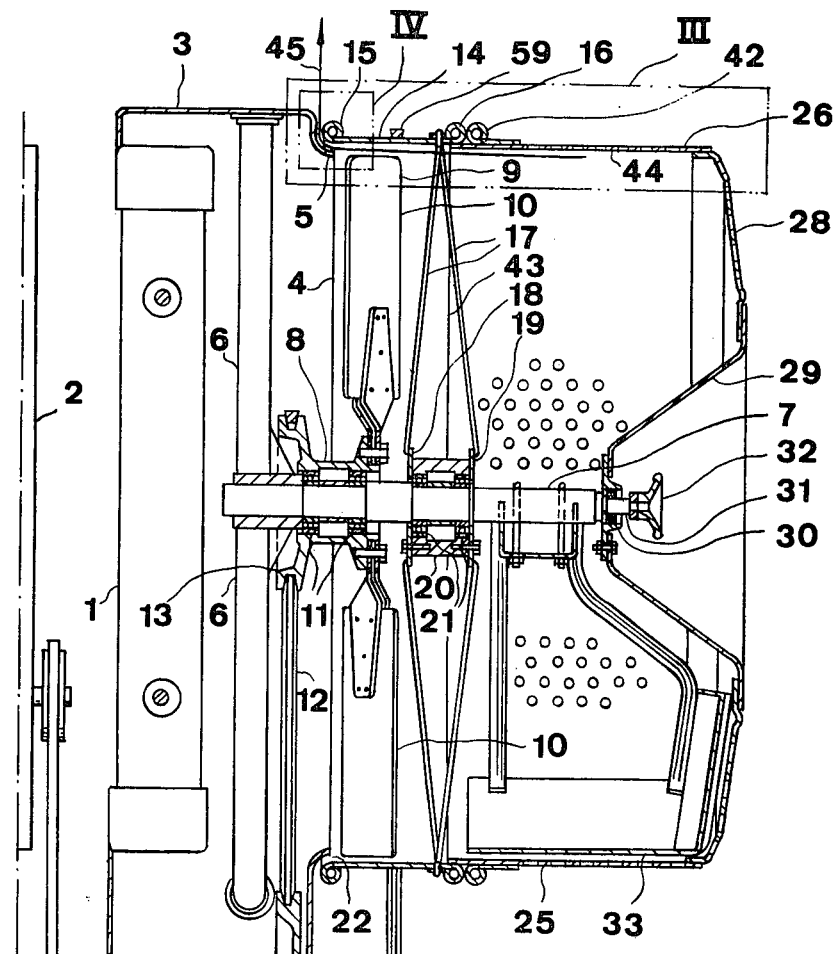
FIG. 2 is an axial section of a rotary air filter generally similar to FIG. 1 but embodying the present invention.

With reference to FIG. 2, the rotary filter embodying the present invention will now be described. The generally cylindrical body 26 of the filter element 25 has a diameter corresponding to, or slightly smaller than the diameter of the annular ring 14. A reinforcing annular member 42 is secured to the outer surface of the cylindrical body 26 at a relatively small distance from its edge 43 facing the casing 3. The components of the air filter assembly are arranged in such a manner so that on the one hand, the edge 43 is a push fit inside the ring 14 and on the other hand, the reinforcing ring 42 abuts against the turned edge 16 of the ring 14. Thus a filter assembly is provided with an unobstructed inner surface 44 when seen in an axial direction from the front wall 28 to the cooling device 1.

In operation, any foreign matter which nevertheless enters the filter element 25 moves, without any obstruction, along the inner surface 44 of the filter body 26 and of the ring 14 towards the cooling device 1, past the location of the fan 9 as a result of the particular air suction pattern 40, (FIG. 3). This foreign matter is discharged from the filter assembly in the direction 45 through the annular discharge opening 22 by the sealing air blast therethrough. Experience has shown that the spokes 17 at the inner side of the ring 14, do not obstruct said movement of the foreign matter towards the annular discharge opening 22. Thus the risk of choking of the cooling device 1 is reduced with the present invention.

Furthermore, the assembly and disassembly of the filter assembly remains very simple because one merely has to unscrew the shaft 31 using the hand wheel 32 after which the filter element 25 can be removed. For re-assembly, the centering turned edge 16 of the ring 14 ensures a correct positioning of the element 25 and tightening of the handwheel 32 urges the element 25, and more particularly the abutment 42, into frictional engagement with the edge 16.

ALTERNATIVE EMBODIMENT

Figure 4:
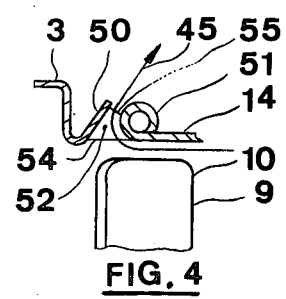
FIG. 4 is a partial sectional view of the portion indicated at IV in FIG. 2 but illustrating another embodiment.

With reference to FIG. 4, an alternative embodiment of the invention will now be described in further detail. The casing 3 has an inclined, turned annular edge 50 positioned generally in the same plane as the face of the fan 9 facing the cooling device 1. The ring 14 has a turned, rolled edge 51 which is positioned around the fan 9 and in front of the edge 50 defining therewith an annular discharge slot 52 for the discharge of foreign matter by a sealing air blast therethrough. The clearance between edges 50 and 51 is larger at its entrance 54 than at its discharge end 55 to ensure that the maximum amount of foreign matter is deflected into the discharge slot 52, on the one hand, while reducing the pressure losses therethrough, on the other hand.

Having thus described the invention, what is claimed is:

1. A rotary air filter assembly comprising,
  (a) a stationary structure having collar means defining a generally circular opening,
  (b) support means secured to the stationary structure generally centrally thereof,
  (c) fan means with opposed intake and pressure sides, rotatably mounted on the support means and adjacent the generally circular opening with the generally circular opening being located on the pressure side of the fan means, said fan means having a diameter substantially corresponding to the diameter of the generally circular opening,
  (d) an annular structure rotatably mounted on the support means and generally surrounding the fan means, said annular structure having opposed ends, one of which is disposed adjacent said collar means defining therewith an annular opening at the pressure side of said fan means,
  (e) perforated filter means mounted detachably and for rotation in unison with the annular structure at the intake side of said fan means, said filter means having an end portion remote from said fan means and an opposite generally circular edge in registration with the end of said annular structure opposite to the collar means, said filter means and said annular structure having a generally unobstructed inner surface lengthwise thereof in the direction from the end portion of said filter means to said annular opening for enabling unobstructed generally linear movement of material along the inner surface towards and through said annular opening,
  (f) first drive means for driving said annular structure and said filter means in unison, and
  (g) second drive means for driving said fan means for drawing air through said filter means, for forcing filtered air through said circular opening in said collar means and for producing an overpressure at the annular opening thereby preventing atmospheric air from penetrating said annular opening during operation.

2. The rotary air filter assembly as recited in claim 1, wherein said annular structure and said perforated filter means are generally cylindrical in shape and have substantially the same diameter.

3. The rotary air filter assembly as recited in claim 1, wherein said collar means and said annular structure comprise facing ends bent outwardly in a manner such that, as seen in cross section, and from the inside of the filter assembly to the outside thereof, said annular opening defined therebetween is tapering.

4. The rotary air filter assembly as recited in claim 1, wherein said annular structure comprises opposed upturned ends, one of which is defining said annular opening in conjunction with said collar means, and wherein said filter means comprise an exterior reinforcing member adjacent the edge for abutting against the other upturned end on said annular structure, the edge of the filter means forming a push fit within the adjacent end of said annular structure.

* * * * *